United States Patent [19]

Morris et al.

[11] Patent Number: 5,403,794
[45] Date of Patent: Apr. 4, 1995

[54] ALUMINA-ZIRCONIA REFRACTORY MATERIAL AND ARTICLES MADE THEREFROM

[75] Inventors: Martin Morris, Imperial; Robert J. Wagner, Pittsburgh, both of Pa.

[73] Assignee: Vesuvius Crucible Company, Wilmington, Del.

[21] Appl. No.: 227,560

[22] Filed: Apr. 14, 1994

[51] Int. Cl.[6] .............................................. C04B 35/48
[52] U.S. Cl. ............................ 501/105; 501/100; 501/128; 501/133; 501/153; 501/154; 222/591; 266/266
[58] Field of Search ............... 501/100, 103, 105, 128, 501/133, 153, 154; 423/335, 414, 608; 251/326; 222/591, 594; 266/266

[56] References Cited

U.S. PATENT DOCUMENTS

| | | | |
|---|---|---|---|
| 1,615,751 | 1/1927 | Fulcher | 501/105 |
| 3,132,953 | 5/1964 | Alper et al. | 501/105 |
| 3,519,447 | 7/1970 | Adams et al. | 501/105 |
| 3,567,473 | 3/1971 | Drever et al. | 106/57 |
| 3,754,950 | 8/1973 | Cevales | 501/105 |
| 3,837,870 | 9/1974 | Recasens et al. | 501/105 |
| 4,053,321 | 10/1977 | Okumiya et al. | 501/105 |
| 4,119,472 | 10/1978 | Brashear, Jr. et al. | 501/105 |
| 4,308,067 | 12/1981 | Guigonis et al. | 501/105 |
| 4,585,485 | 4/1986 | Shikano et al. | 501/105 |
| 4,657,877 | 4/1987 | Becher et al. | 501/89 |
| 5,045,511 | 9/1991 | Bosomworth et al. | 501/85 |
| 5,055,433 | 10/1991 | Niwa et al. | 501/105 |
| 5,086,020 | 2/1992 | Ishino et al. | 501/105 |
| 5,183,610 | 2/1993 | Brog et al. | 264/56 |
| 5,214,010 | 5/1993 | Whittemore | 501/105 |
| 5,215,666 | 6/1993 | Kuszyk et al. | 222/591 |

OTHER PUBLICATIONS

Yokoyama et al., "Effect of Fused $Al_2O_3$-$ZrO_2$ on Properties of Sliding Nozzle Plate", UNITECR '93 Congress, pp. 1076-1086 (Date unknown).

*Primary Examiner*—Mark L. Bell
*Assistant Examiner*—Michael Marcheschi
*Attorney, Agent, or Firm*—Webb Ziesenheim Bruening Logsdon Orkin & Hanson

[57] ABSTRACT

A refractory article such as a slide gate plate, well block nozzle or like refractory component used in continuous casting of chemically aggressive grades of steel is made from a mixture containing about 50-85 wt. % alumina; about 5-30 wt. % alumina-zirconia fused grain; about 3-10 wt. % zirconia; and about 3-10 wt. % silica, plus an effective amount of binder materials to permit extrusion, pressing or like forming process. The pressed shape is fired in an air atmosphere at temperatures in excess of 1000° C. to form an oxide bond. The composition of the fired material comprises about 60-90 wt. % alumina; about 5-30 wt. % zirconia; and about 3-10 wt. % silica. The fired article exhibits excellent hot strength and is resistant to thermal shock and resistant to the erosive and corrosive effects of molten steel, including aggressive, high manganese and calcium treated grades.

17 Claims, 2 Drawing Sheets

ALUMINA-ZIRCONIA REFRACTORY MATERIAL AND ARTICLES MADE THEREFROM

BACKGROUND OF THE INVENTION

The present invention relates generally to materials and articles for use in handling molten metals and, more particularly, to refractory compositions and articles made therefrom which are resistant to the thermal shock and erosive effects of liquid steel.

In the continuous casting of steel it is common to employ slide gate valves to control the flow of the molten metal from a furnace or from a ladle to a tundish and thence from the tundish to the molds of the continuous caster. The refractory plates and nozzles of the slide gate valves are subjected to an extremely hostile working environment in which resistance to thermal shock and erosive chemical attack from the molten steel and slag are key attributes in achieving a reasonable refractory service life.

With the introduction of more chemically aggressive grades of steel, the ongoing goal to increase refractory life at a reasonable cost has also become an increasingly difficult challenge. Generally, refractory compositions may be formulated to provide greater resistance to chemical erosion but typically at the expense of lower thermal shock resistance. Conversely, thermal shock resistance properties may be increased but at the expense of diminished corrosion resistance.

Heretofore, a known refractory composition containing alumina-mullite has been used in the manufacture of some slide gate plates and nozzle combinations. This known alumina-mullite composition has been generally successful in resisting steel erosion, at least with conventional grades of steel, and, in addition, it has exhibited adequate thermal shock resistance for this application and at a reasonable cost.

It is also known to employ a carbon-bonded, alumina-graphite refractory composition as a slide gate material. This material, while exhibiting excellent thermal shock properties, nevertheless, suffers from the fact that the carbon component is subject to oxidation and subsequent erosion.

Alumina-zirconia compositions have also been proposed for use in slide gate plate applications as disclosed in U.S. Pat. Nos. 5,055,433 and 5,214,010, but these materials also contain substantial amounts of carbon to form a carbon bond in the refractory matrix. Carbon-bonded refractories are, of course, well-known for their thermal shock resistant properties. It is also conventional practice, as disclosed in U.S. Pat. No. 5,055,433, to fire or burn these carbon containing refractories at high temperatures, generally above 1000° C. in a reducing atmosphere. Alternatively, it is also known, as taught in U.S. Pat. No. 5,214,010, to thermally cure a carbon containing pressed refractory shape at a temperature below the burning temperature and then impregnate the shape with tar, pitch or like hydrocarbon and bake. Tar impregnated slide gate plates of other refractory materials, such as, for example, magnesia and alumina are also known in the art.

The present invention overcomes the inherent expense and shortcomings of prior carbon-bonded slide gate refractories by providing an oxide-bonded refractory material which provides excellent erosion/corrosion resistance in the presence of chemically aggressive steel grades, such as, for example, calcium treated steels. The refractory composition of the present invention further provides superior thermal shock properties without the presence of carbon. The absence of carbon/graphite also lowers raw material costs and permits firing without special furnace atmospheres to protect the carbon. Thus, manufacturing costs are decreased to provide a less expensive product to the steel producer. As a result, overall steel production costs are lowered which translates into a lower per ton steel cost relative to the consumable refractory slide gate plates and components.

SUMMARY OF THE INVENTION

Briefly stated, the present invention is directed to an improved alumina-zirconia refractory composition suitable for use in manufacturing various shapes, particularly, slide gate plates, collector nozzles and like shapes for use in steelmaking operations. The resultant slide gate plates exhibit improved steel erosion resistance, improved thermal shock resistance, excellent hot strength and provide a unit cost savings over conventional refractory compositions. The composition of the present invention is particularly resistant to the erosive effects of aggressive calcium silicon treated grades of steel.

The improved refractory composition of the invention is made from a mix consisting essentially of, in weight %, on a dry basis: about 50–85% and, more preferably, about 70–80% alumina; about 5–30% and, more preferably, about 10–20% fused alumina-zirconia grain; about 3–10% unstabilized, monoclinic zirconia; and about 3–10% silica. The alumina portion preferably comprises a sized and graded mixture of tabular alumina and calcined alumina in a ratio of about 4:1 tabular alumina to calcined alumina. Fused alumina may also be used in partial or complete substitution for the tabular alumina constituent. The silica constituent is preferably very fine, such as a fumed silica or microsilica.

A still further presently preferred composition according to the invention is made from a mix consisting essentially of in weight %, on a dry basis, about: 75% alumina, the alumina comprising about 60% tabular alumina and about 15% calcined alumina; 15% fused alumina-zirconia grain; 5% monoclinic zirconia; and 5% microsilica. The dry materials of the mix are blended with small amounts of a starch binder, dispersant and water. The blended mixture is then pressed or otherwise compacted into a desired shape and subsequently fired at a temperature in excess of 1832° F. (1000° C.), more preferably at, for example, 2700° F. (1482° C.), or cone 16.

The fired refractory shape has a chemical analysis comprising in weight % about: 80–90% $Al_2O_3$; 5–15% $ZrO_2$; and 3–10% $SiO_2$. A further presently preferred composition of the fired material of the invention comprises about 85 wt. % alumina; about 10 wt. % zirconia; and about 5 wt. % silica. The fired material exhibits a typical modulus of rupture of between about 2500–4400 psi at room temperature and on the order of at least about 1500 psi and, more preferably, at least about 2000 psi at 2700° F. (1482° C.). The fired material is characterized by having an apparent porosity of about 9.5%–14.5%, an apparent specific gravity of about 3.7 to 3.8, a bulk density of about 3.20 to 3.30 g/cm$^3$, a sonic velocity of about 3500–4000 M/Sec, and a coefficient of thermal expansion of about $7.5 \times 10^{-6}$ cm/° C. up to 1500° C.

DETAILED DESCRIPTION OF THE INVENTION

Figure 1:
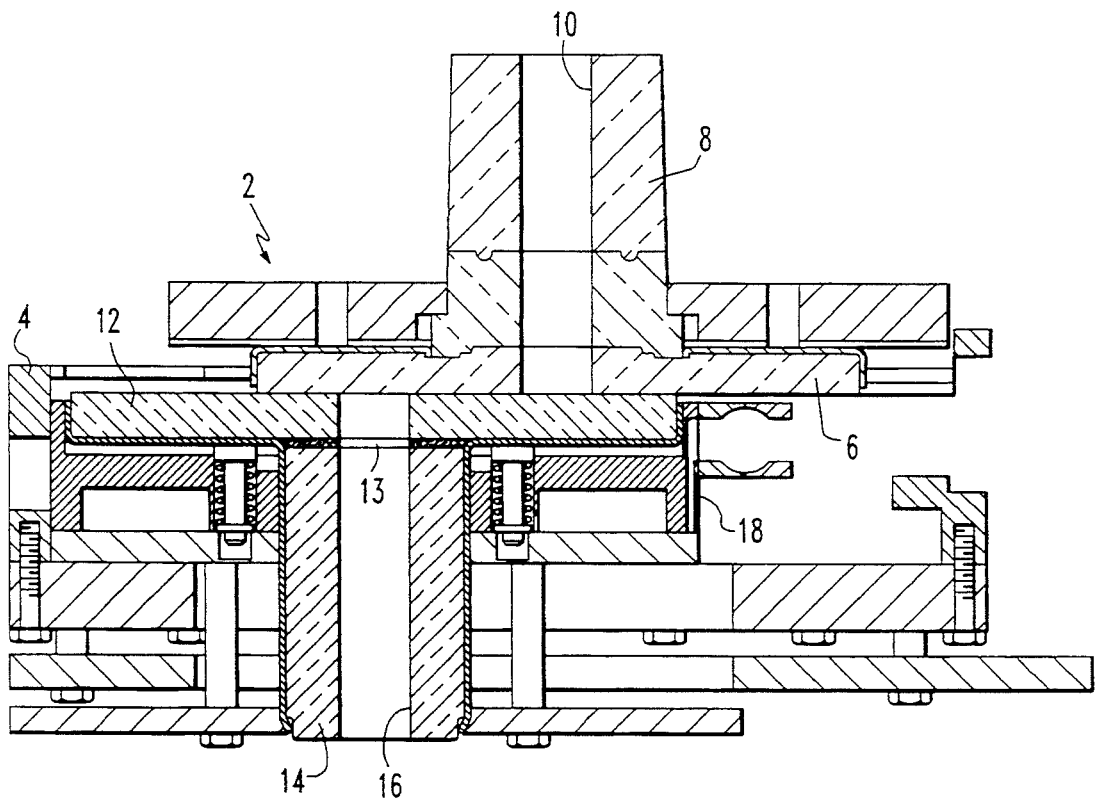
FIG. 1 is a cross sectional side elevation view of a slide gate valve including refractory shapes according to the present invention particularly suitable for use in controlling molten metal flow from a steelmaking ladle in a continuous casting operation.

The refractory composition of the present invention is particularly suitable for use in manufacturing the molten metal contacting components of a slide gate valve 2 shown in FIG. 1. The slide gate valve 2 is a two-plate valve of the type used in controlling the flow of molten metal from a ladle (not shown). The valve 2 is mounted on the bottom of the ladle to control the flow of molten steel from the ladle to a tundish and thence to one or more continuous casting molds, all of which is well-known in the art of steelmaking.

Figure 2:
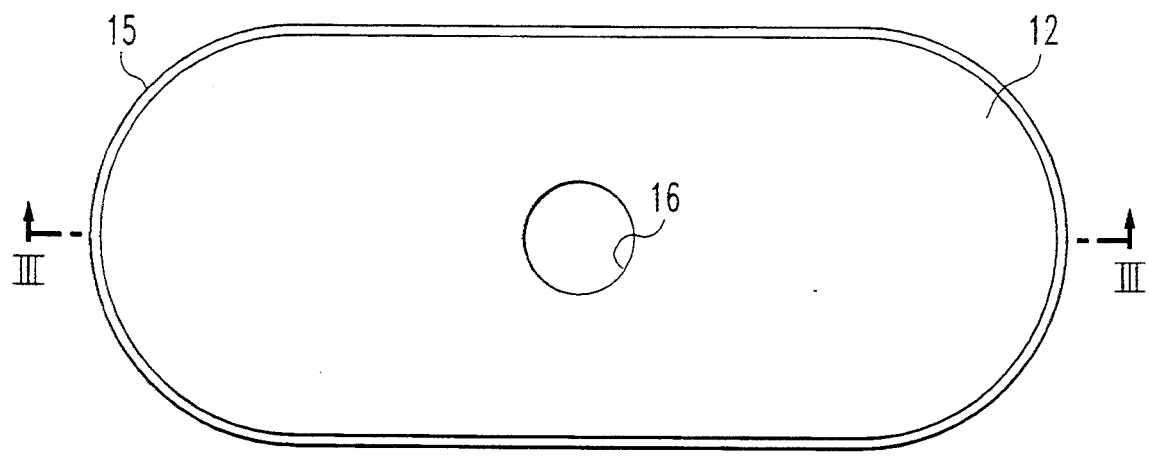
FIG. 2 is a slightly enlarged, plan view of the bottom plate of the ladle slide gate valve of FIG. 1.
Figure 3:
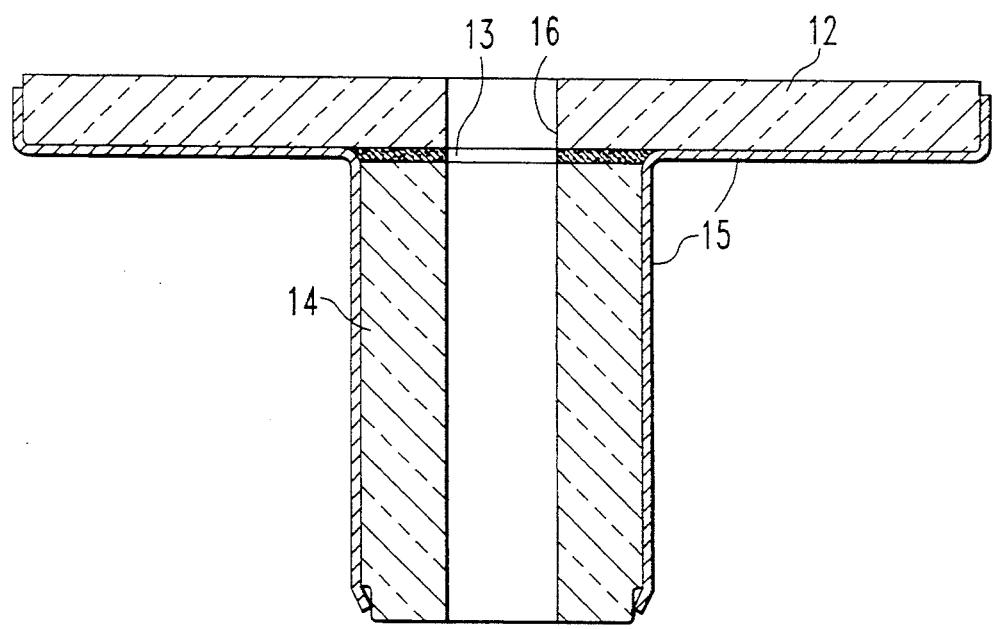
FIG. 3 is a cross sectional side elevation view of the bottom plate and integral collector nozzle taken along line III—III of FIG. 2.

The slide gate valve 2 conventionally includes a rigid frame 4 which carries a stationary upper plate 6 with an inner nozzle or well block nozzle 8 positioned thereon. The well block nozzle and upper plate have a metal teeming bore 10 formed therein to permit the passage of molten metal therethrough. The well block nozzle is adapted to fit into a well block orifice (not shown) at the bottom of the ladle in a conventional manner. A slidable bottom plate 12 and collector nozzle 14 having a metal teeming bore 16, are mounted in a moveable carrier 18 for controlled movement in the frame 4 by a conventional hydraulic drive means (not shown). As seen in FIGS. 2 and 3, the collector nozzle 14 may be secured to the bottom plate 12 by way of a refractory cement joint 13. The top and bottom plate assemblies are also encased in a protective steel jacket 15 which in itself is well-known in the art.

In a closed position, depicted in FIG. 1, the teeming bores 10 and 16 are offset from one another which prevents the passage of molten steel through the teeming bores. When the bottom plate 12 is slid to the right, the bores 10 and 16 of the top and bottom plates are brought into registry to open the valve 2. Thus, it will be readily understood that the top and bottom plates 6 and 12, along with their respective nozzles 8 and 14, are directly exposed to the erosive, corrosive and thermal shock effects of the molten steel. The refractory composition of the present invention is particularly suitable for the manufacture of the aforementioned slide gate valve plate components and related nozzles due to the unique properties exhibited thereby and its ability to tolerate the harsh operating environment, particularly present when aggressive steel grades are being cast.

In order to demonstrate the attributes of the present invention, a laboratory batch was prepared according to the ingredients and proportions set forth in Table I below.

TABLE I

| Raw Batch - Mix | wt. % |
|---|---|
| a. Alumina | |
| (1) Tabular Alumina: | 59.0% |
| 8/−325 mesh graded mixture | |
| (2) Calcined Alumina: | 15.0% |
| −325 mesh | |
| Total Al$_2$O$_3$ | 74.0% |
| b. Fused Alumina-Zirconia Grain (25% ZrO$_2$): | 15.0% |
| 20/100 mesh | |
| c. Fused Zirconia (Unstabilized): | 6.0% |
| −325 mesh | |
| d. Microsilica: | 5.0% |
| | 100.0% |
| Plus Starch (Dextrine) Binder Addition: | 3–4 wt. % |

The tabular alumina constituent is a so-called "dead burned" alumina which has been fired at a high temperature to produce a dense, low porosity grain. The tabular alumina material provides maximum strength and good erosion resistance. The calcined alumina constituent is in a fine, particulate form and is made from an alumina material which has been fired at a lower temperature than the aforementioned tabular alumina. As a result, calcined alumina is not fully densified and, thus, possesses a high surface area. Because calcined alumina is more reactive due to this higher surface area, it functions well as a bonding phase during firing of the refractory composition of the present invention. Preferably, tabular alumina is present in about a 4:1 weight ratio relative to the calcined alumina. A size graded mixture of alumina is employed to maximize packing density and may include a fused alumina grain, wherein at least about 15 wt. % of the mixture is calcined alumina in a fine −325 mesh size.

The alumina-zirconia grain mix constituent is made from a pre-fusion (melt) of alumina and zirconia materials. A presently preferred alumina-zirconia composition consists of a fusion product comprising about 75 wt. % alumina and about 25 wt. % zirconia. The fused alumina-zirconia material is believed to be beneficial in providing increased erosion resistance.

Microsilica, also known in the art as fumed silica or volatized silica, is believed to contribute to the improved hot strength and thermal shock resistance of the fired product. The microsilica is extremely finely divided powder having a typical surface area of 50–200 m$^2$/grain. It is theorized that monoclinic zirconia reacts with the microsilica at intermediate firing temperatures to form zircon. At higher temperatures, it is believed that the zircon dissociates, whereupon the freed silica reacts with alumina to form mullite to provide excellent thermal shock resistance. It may also be possible to substitute zircon in the mix for the separate silica and zirconia additions.

The binder system is in itself conventional and is employed to provide the necessary green strength after compaction/forming by dry pressing, extrusion or injection molding. Typical binder systems include starch, resin or ligno-sulfinate, for example, all well-known in the art.

The raw materials set forth in Table I were thoroughly mixed in an Eirich brand mixer. The mixture was then extruded and pressed into the form of a slide gate plates 6 and 12 shown in the drawings. The composition of the invention is particularly suitable for use as a plate in a ladle gate valve where higher resistance to aggressive steel grades such as calcium-silicon treated grades is needed. The composition is also useful in making plates for tundish gate valves and furnace valves as well as inserts and nozzles for these various valve components.

The plates were dried and then fired or burned at a temperature of about 2700° F. (1482° C.). Firing at temperatures above 1832° F. (1000° C.) in an air furnace atmosphere is permissible in practicing the invention since there is no need to employ a special reducing atmosphere or inert atmosphere as is typically required in firing conventional carbon-bonded refractory materials.

After firing, the shape made from the material of Table I was analyzed and had the following as-fired composition:

Alumina ($Al_2O_3$): 85%
Zirconia ($ZrO_2$): 9.8%
Silica ($SiO_2$): 5.2%

The fired material was subjected to standard ceramic tests and exhibited the following physical properties:

| a. Modulus of Rupture (MOR): | 3161 psi @ room temp. |
| --- | --- |
|  | 2056 psi @ 1482° C. |
| b. Apparent porosity: | 12.9% |
| c. Bulk density: | 3.27 g/cm$^3$ |
| d. Apparent specific gravity: | 3.76 |

The fired plates may be impregnated with a carbonaceous material such as tar or resin in a conventional manner prior to service.

Four trial plates were made according to the mix formulation of Table I to thus provide two "sets" of plates, each set comprising a top stationary plate 6 and a bottom, slidable gate plate 12. These plates were installed in a ladle gate valve similar to gate valve 2 in a commercial steel mill where aggressive steel grades of the type typically comprising high manganese and calcium treated grades were being run. This particular steel producer normally required the use of expensive zirconia plates when casting aggressive steel grades.

One type of standard slide gate plate is made from a refractory composition containing about 95% alumina and 5% silica. Such plates are commonly used on less aggressive or so-called standard grades of steel. Typically, such standard, alumina-silica slide gate plates are eroded severely by more aggressive grades of steel. These plates after some period of service become so severely eroded that they do not shut off after casting aggressive grades. Thus, for safety reasons, such plates cannot be used when casting aggressive grades of steel.

The two sets of plates made from the refractory composition of the invention were placed in service on a ladle containing an aggressive grade of steel, of the grade normally requiring zirconia plates. It was observed that the test plates of the invention successfully shut off the molten metal flow at the conclusion of the casting sequence, indicating the ability of the composition to resist severe erosion. Visual examination of the used plates failed to show any unusual or problematic thermal shock properties. The used plates did exhibit some degree of erosion; however, the erosion was not deemed to be excessive or unusual considering the aggressive nature of the steel being cast.

Additional mixes were formulated to produce refractory compositions according to the present invention. These mix formulations are set forth in Tables II and III below along with the fired physical properties for each.

TABLE II

|  | wt. % (dry basis) |
| --- | --- |
| a. Alumina |  |
| (1) Tabular $Al_2O_3$ | 60.0 |
| (2) Calcined $Al_2O_3$ | 19.0 |
| Total $Al_2O_3$ | 79.0 |
| b. Fused Alumina-Zirconia (25% $ZrO_2$) | 13.0 |
| c. Monoclinic Zirconia | 3.0 |
| d. Microsilica | 5.0 |
| Physical Properties: | (Same binders as in Table I) |
| MOR: | 4740 psi @ room temp.; |
|  | 2471 psi @ 2500° F. |
| Apparent Porosity: | 13.9% |
| Bulk Density: | 3.23 g/cm$^3$ |
| Apparent Specific Gravity: | 3.75 |

TABLE III

|  | wt. % (dry basis) |
| --- | --- |
| a. Alumina |  |
| (1) Tabular $Al_2O_3$ | 55.0 |
| (2) Calcined $Al_2O_3$ | 19.0 |
| Total $Al_2O_3$ | 74.0 |
| b. Fused Alumina-Zirconia (25% $ZrO_2$) | 18.0 |
| c. Monoclinic Zirconia | 3.0 |
| d. Microsilica | 5.0 |
| Physical Properties: | (Same binders as in Table I) |
| MOR: | 3640 psi @ room temp.; |
|  | 1986 psi @ 2500° F. |
| Apparent Porosity: | 13.6% |
| Bulk Density: | 3.19 g/cm$^3$ |
| Apparent Specific Gravity: | 3.69 |

In accordance with the present invention, the proportions of the various constituents may be varied within the following ranges without departing from the scope and spirit of the invention. A preferred compositional range of the fired refractory comprises about: 80–90 wt. % $Al_2O_3$; 5–15 wt. % $ZrO_2$; and 3–10 wt. % $SiO_2$. This refractory is made from a raw mix consisting of the various amounts of alumina, alumina-zirconia fused grain and small amounts of monoclinic and/or partially stabilized zirconia and a very fine microsilica, plus binders and water as set forth above. Preferably, the raw mix comprises in weight % on a dry mix basis: about 70–80% alumina; about 10–20% fused alumina-zirconia grain; about 3–10% fused zirconia; and about 3–10% microsilica. The relative amounts of alumina and the alumina-zirconia fused grain to be used in the mix are naturally dependent upon the composition of the alumina-zirconia material employed in the raw mix. Preferably, a fused alumina-zirconia material containing 25 wt. % $ZrO_2$ is used.

While the exact mechanism responsible for the erosion resistance and thermal shock resistance is not fully understood, it is theorized that each of the constituents plays a role in achieving the several desired properties of the fired article. The presence of the high temperature fired alumina (tabular or fused alumina) improves erosion/corrosion resistance along with the zirconia constituent. Improved erosion resistance naturally results in a longer refractory life, which is particularly important when casting aggressive calcium grades of steel. It is further believed that the microsilica in the mix contributes to maintenance of hot strength and thermal shock resistance. During firing of the refractory shape, the microsilica reacts with the free, monoclinic zirconia to form zircon at intermediate temperatures. The zircon, in turn, dissociates at higher temperatures along with the free silica to form mullite. It is presently theorized that this is an essential mechanism for providing improved thermal shock resistance and erosion resistance over conventional alumina-silica refractory compositions. It is also believed that the approximately 50% silica reduction in the material of the present invention versus conventional alumina-silica compositions contributes to the improved erosion resistant properties of the instant materials.

Commercial Trial No. 1

A number of slide gate plate sets were made from a composition according to the present invention which exhibited a fired composition consisting essentially of 82.9 wt. % $Al_2O_3$; 5.1 wt. % $SiO_2$; 9.5 wt. % $ZrO_2$; and 2.5 wt. % (lost on ignition). The slide gate plates were tar impregnated prior to use. The fired and tar impregnated material exhibited an apparent porosity of 9.54%; a bulk density of 3.34 g/cc; an apparent specific gravity of 3.69; and a modulus of rupture at room temperature of 4412 psi.

A commercial trial of ten ladle slide gate sets having the above composition were installed in a commercial steel mill casting standard and calcium silicon and manganese grades of steel.

It was observed that all ten of the trial slide gate sets performed satisfactorily for a minimum of three heats each, which is considered to be acceptable in a commercial application.

Commercial Trial No. 2

An additional ten ladle slide gate sets were made from the mix set forth in Table I and subjected to a trial in another commercial steel mill on a four-strand caster and on a six-strand caster.

The steel grades cast contained varying amounts of calcium (0 to 35 ppm) and carbon (0.08%–0.74%). The standard ladle gate plates normally used at this steel mill were made from a tar impregnated magnesia refractory product which at the time of the trial exhibited an average life of 2.5 heats per bottom gate plate and 2.0 heats per top plate, on a standard 115 ton ladle (heat) size. The results of this trial indicated that the bottom gate plates of the invention exhibited an average life of 4.3 heats, while the top plates of the invention had an average life of 4.1 heats. Thus, a substantial improvement in service life over the conventional magnesia composition was observed.

Commercial Trial No. 3

A third and more extensive trial was conducted at another commercial steel mill employing 62 ladle slide gate sets, extending over a two-week period. The slide gate plates of the invention were tar impregnated prior to use. This trial was run at a continuous casting facility running low carbon, aluminum killed, deep drawing steels. The standard slide gate plates used in this facility were made from a carbon-bonded, alumina-graphite material also tar impregnated. This conventional material had been yielding an average of 4.7 heats per plate at an average plate cost of $0.365 per ton of steel based on a 228 ton ladle size.

The 62 plate sets of the present invention were also run on the 228 ton ladles and found to have an average trial life of 4.5 heats, with individual sets yielding six or more heats. On a cost basis, the 62 plate sets of the invention represented an average cost of $0.317 per ton of steel cast. The material and production costs per unit were, therefore, less for slide gate plates of the present invention than for the conventional carbon-bonded, alumina-graphite product. Thus, the slide gate plates of the invention represented an average savings of almost 5¢ per ton of steel cast over conventional alumina-carbon slide gate plates.

In summary, the commercial trials indicated that the slide gate plates of the invention represented a cost savings and/or performed better than conventional slide gate compositions, including alumina-mullite, zirconia, alumina-carbon, and tar impregnated magnesia refractory products.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A refractory article resistant to thermal shock and steel erosion and exhibiting excellent hot strength, said article made from a mix consisting essentially of, on a dry mix basis, about 50–85 wt. % particulate alumina; about 5–30 wt. % alumina-zirconia fused grain; about 3–10 wt. % zirconia; and about 3–10 wt. % silica.

2. The refractory article of claim 1 having a fired composition consisting essentially of about 60–90 wt. % alumina; about 5–30 wt. % zirconia; and about 3–10 wt. % silica.

3. The refractory article of claim 1 having a fired composition consisting essentially of about 85 wt. % alumina; 10 wt. % zirconia; and about 5 wt. % silica.

4. The refractory article of claim 1 wherein the particulate alumina of the mix comprises a mixture of calcined alumina and at least one member selected from the group consisting of tabular alumina and fused alumina.

5. The refractory article of claim 4 wherein the particulate alumina comprises about 60 wt. % tabular alumina and about 15 wt. % calcined alumina based on a total dry mix weight.

6. The refractory article of claim 1 wherein the alumina-zirconia fused grain comprises about 25 wt. % zirconia.

7. The refractory article of claim 1 in the form of a slide gate plate.

8. The refractory article of claim 1 in the form of a collector nozzle.

9. The refractory article of claim 1 in the form of a well block nozzle.

10. A fired, oxide-bonded refractory article having a composition comprising about 80–90 wt. % alumina; about 5–15 wt. % zirconia; and about 3–10 wt. % silica, said refractory article made by forming and firing at a temperature greater than about 1000° C., a mixture consisting essentially of, on a dry mix basis, about 70–80 wt. % particulate alumina; about 10–20 wt. % alumina-zirconia fused grain; about 3–10 wt. % zirconia grain; and about 3–10 wt. % finely divided silica.

11. The refractory article of claim 10 in the form of a slide gate plate.

12. The refractory article of claim 10 in the form of a collector nozzle.

13. The refractory article of claim 10 in the form of an inner nozzle.

14. A slide gate plate of a fired, oxide-bonded refractory composition comprising about 82–87 wt. % alumina; 8.5–12.5 wt. % zirconia; about 4.8–5.4 wt. % silica; balance incidental constituents.

15. The slide gate plate of claim 14 consisting essentially of about 85 wt. % alumina; about 10 wt. % zirconia; and about 5 wt. % silica.

16. The slide gate plate of claim 15 which is impregnated with a carbonaceous material.

17. The slide gate plate of claim 16 where the carbonaceous material is one selected from the group consisting of tar and resin.

* * * * *